US011618589B2

(12) United States Patent
Avena De Azevedo et al.

(10) Patent No.: US 11,618,589 B2
(45) Date of Patent: Apr. 4, 2023

(54) ANCHORING PLATFORM FOR CAPTIVE LIGHTER-THAN-AIR AIRCRAFT (71) Applicant: ALTAVE INDÚSTRIA, COMÉRCIO E EXPORTAÇÃO DE AERONAVES S A, São José Dos Campos (BR)

(72) Inventors: Bruno Avena De Azevedo, São José Dos Campos (BR); Jônatas Sant'Anna Santos, São José Dos Campos (BR); Michelle Bueno Garcia, São José Dos Campos (BR)

(73) Assignee: Altave Industria, Comercio Exportacao De Aeronaves S.A., Sao Jose Dos Campos (BR)

( * ) Notice: Subject to any disclaimer, the term of this patent is extended or adjusted under 35 U.S.C. 154(b) by 552 days.

(21) Appl. No.: 16/494,676

(22) PCT Filed: Mar. 14, 2018

(86) PCT No.: PCT/BR2018/050068
§ 371 (c)(1),
(2) Date: Sep. 16, 2019

(87) PCT Pub. No.: WO2018/165728
PCT Pub. Date: Sep. 20, 2018

(65) Prior Publication Data
US 2020/0039663 A1 Feb. 6, 2020

(30) Foreign Application Priority Data
Mar. 14, 2017 (BR) .................. 10 2017 0051366

(51) Int. Cl.
B64F 3/00 (2006.01)
B64B 1/52 (2006.01)
(Continued)

(52) U.S. Cl.
CPC .................. B64F 3/00 (2013.01); B64B 1/52 (2013.01); B64B 1/66 (2013.01); B66C 1/12 (2013.01); B66D 1/36 (2013.01)

(58) Field of Classification Search
CPC ................ B64B 1/50; B64B 1/66; B64F 3/00
See application file for complete search history.

(56) References Cited

U.S. PATENT DOCUMENTS 4,421,286 A    12/1983  Laky et al. .................... 244/116
4,842,218 A     6/1989  Jakubowski et al. ........... 244/31
(Continued)

FOREIGN PATENT DOCUMENTS

BR    102013001316    8/2014    ............... B64B 1/02
CN    101898633       12/2010   ............... B60P 3/00
(Continued)

OTHER PUBLICATIONS

International Preliminary Report on Patentability (w/translation) issued in application No. PCT/BR2018/050068, dated Sep. 17, 2019 (9 pgs).

(Continued)

Primary Examiner — Nicholas McFall
Assistant Examiner — Eric Acosta
(74) Attorney, Agent, or Firm — Neal Marcus (57) ABSTRACT An anchoring platform is disclosed for captive aircraft that addresses problems when handling captive aerostats, including excessive workload required to switch between flying and anchored states. The anchoring platform includes an anchoring device. Cords, together with a confluence point, are wound into the anchoring device, by the winch. The structure for anchoring the captive aircraft is the cradle which bears the aerostat, while the winch exerts tension to hold same static in the structure.

18 Claims, 5 Drawing Sheets (51) Int. Cl.
  *B64B 1/66*   (2006.01)
  *B66C 1/12*   (2006.01)
  *B66D 1/36*   (2006.01)

(56) References Cited

U.S. PATENT DOCUMENTS

| | | | |
|---|---|---|---|
| 5,456,426 A * | 10/1995 | Wexler | B64B 1/66 |
| | | | 244/33 |
| 9,981,755 B2 | 5/2018 | Azevedo et al. | B64F 1/14 |
| 2012/0181380 A1 | 7/2012 | Van Staagen et al. | 244/33 |
| 2012/0181381 A1 | 7/2012 | Vercesi et al. | 244/96 |
| 2015/0083849 A1 | 3/2015 | Glass et al. | B64B 1/12 |
| 2015/0183527 A1 | 7/2015 | Hachtmann et al. | B64F 1/12 |
| 2015/0298806 A1 | 10/2015 | Vander Lind et al. | |
| | | | B64C 39/022 |
| 2016/0207626 A1 | 7/2016 | Bailey | B64C 39/022 |
| 2016/0347594 A1 | 12/2016 | Shmueli | B66D 1/741 |
| 2017/0029105 A1 | 2/2017 | Ferren et al. | B64C 39/022 |

FOREIGN PATENT DOCUMENTS

| | | | | |
|---|---|---|---|---|
| KR | 101678164 | 11/2016 | | B64B 1/58 |
| WO | WO2014200566 | 12/2014 | | B64B 1/50 |

OTHER PUBLICATIONS

International Search Report and Written Opinion (w/translations) issued in application No. PCT/BR2018/050068, dated Apr. 4, 2018 (14 pgs).

* cited by examiner

ANCHORING PLATFORM FOR CAPTIVE LIGHTER-THAN-AIR AIRCRAFT

FIELD OF THE INVENTION

The present invention addresses to the field of technologies related to captive lighter-than-air aircraft and simplified and optimized means for the anchoring platform thereof.

BACKGROUND OF THE INVENTION

The captive lighter-than-air aircraft, especially the captive balloon or captive aerostat, is a highlight for communication, military monitoring and large event monitoring solutions.

Generally, captive balloons are anchored on large platforms that take up a space considerably larger than the aerostat itself. Normally, the use of these platforms requires more than one person to handle the system, and, in addition, the fixation must be firm and secure so as not to allow the balloon to escape from the anchoring platform. Such fixations are often difficult to implement and require a lot of manual effort. Because of these difficulties, developers in this technology sector are increasingly seeking simplicity and practicality in the handling of captive aerostats.

In aerostats, the cable exit direction varies substantially in a large opening cone. That is, the aerostat can be in any direction since its stabilization is passive, that is, it will always be oriented in the direction of the wind. There is also the horizontal displacement versus height ratio (called blowby) that also depends on wind magnitude, cable cross-sectional diameter, atmospheric turbulence, and net thrust (thrust generated by gas minus self-weight, minus payload weight). The problem is aggravated when using electromechanical (EM) or electro-optical-mechanical (EOM) cables, which require a high minimum bend radius on the winch to preserve the service life of the cable, preventing core breakage.

Therefore, the operating condition of the anchoring platform needs to allow freedom for proper operation of the aerostat and anchor cable, and must withstand mechanical stresses when the balloon is flying and anchored to the ground.

One solution to this problem is to create a way that the anchor can be operated automatically without the need for personnel to handle the same and, in addition, supports all of the above-mentioned features regarding the operating condition of the anchoring platform for safely fixing the aerostat.

STATE OF THE ART

In captive balloons, the anchoring platform includes the anchor device and the structure for anchoring the lighter-than-air captive aircraft. Such a system is very important because it enables the captive balloons to perform their tactical functions efficiently, as well as favoring the withdraw, lifting and anchoring of the aerostat.

When said balloon is anchored it is necessary that the platform provides favorable conditions for the handling of the aerostatic system, including the balloon and all components installed therein.

The patent literature describes both aerostats and their anchoring systems. Document CN 101898633 discloses an anchoring device on a semi-trailer for small and medium sized aerostats, provided with a mooring tower. The system consists of the following components: a semi-trailer, a rotating platform fixed to the semi-trailer by means of a rotating support, a mooring tower positioned at the front of the rotating platform, a plurality of horizontal support arms positioned at the rear of the platform, and a box of capsules that is also arranged at the rear of the rotating platform. Although useful, this anchoring platform is large in size. Such a process requires a mast that is at least half the height of the aerostat and occupies a space larger than said aerostat, since the balloon needs to be fixed within the structure of the anchoring platform.

Documents US 20120181380, WO23014200566A2 and U.S. Pat. No. 4,421,286A are similar to the above-mentioned patent with respect to the existence of a mast docking system. US20120181380 differs only in that it has a helium aerostat inflating system and a computerized aerostat control system. WO23014200566A2 differs in that it has a system for maintaining the aerostat inflated with a helium reserve on the anchoring platform. U.S. Pat. No. 4,421,286A differs in that it is larger than all other anchoring platforms, it has three bases for lifting the aerostat, in which each base consists of a distinct winch.

Document U.S. Pat. No. 4,842,219 resembles those mentioned above with regard to the existence of a mast for fixing the aerostat, but anticipates a system with fixation of light indicators on the cable during launch, it also has an anchor device with a degree of freedom that allows it to rotate about the vertical axis and a slight upward and downward inclination to try to control the stress of the safety cable to prevent its breakage. This anchor device, however, is not able to rotate vertically and the anchoring is performed by one end of said aerostat in a tower present on the platform.

Patent document US2012181381 is a ground aerostat anchoring platform which enables a minimum bend radius to be maintained in the cable, which is provided with a rigid structure to guide the safety cable. However, as the structure is rigid, a force of high magnitude is applied to the cable. The composition of this system is made of metal, and therefore the friction of the cable in the structure must be considerably large, which is disadvantageous as it can cause mechanical damage to the anchor cable, besides bringing relevant structural requirements to the cable guide structure. Another feature is that the system does not have a secure system that can support the anchored aerostat, and said aerostat must be grounded when not in flight.

Document US20150083849 provides a system with a base station. The rotating platform including rails for anchoring the aerostat allows snap-in without auxiliary ties, minimizing or eliminating the ground crew required to dock traditional aerostatic systems. However, it uses four anchor cables that fix the aerostat to the anchoring platform. Using four anchor cables restricts the aerostat freedom to self-steer in a wind direction, making it more vulnerable to high-speed winds. In addition, the system comes at a higher cost because cable weights are very relevant in determining the weight that balloons up to hundreds of cubic meters in volume can support in flight.

The state of the art, therefore, anticipates different forms of aerostat anchoring platforms. However, all those capable of supporting the aerostat in a position suitable for handling the payload occupy a much larger space than that of the aerostat itself. In addition, most need a ground crew to dock traditional aerostatic systems.

Advantages of the Invention

In order to overcome the deficiencies of the prior art as discussed above, the present invention proposes disruptive solutions applied in captive aircrafts so that operations with the lowest level of complexity are feasible, focusing on the need of fewer people for safe and practical application.

The system consists of the cradle and winch, the cradle having a closed circular rim shape with a support based on cylindrical rods of adjustable size from 1 to 3 meters high and 1 to 3 meters in diameter. In addition, said cradle is intended to be the support base of the anchored aerostat and to be a limiting of the in-flight inclination angle of the anchor cable so that it does not escape from the interior in case of loss of height of the aerostat. The winch is located inside the cradle and its function is to collect and lift the anchor cable attached to the balloon.

Said platform can be installed by only one person on a mobile base, such as a trailer or be installed on a fixed base.

During installation of said anchoring platform only one person is required to secure the balloon ropes, supply it with a gas lighter than air (usually helium gas or hydrogen gas) and secure the gondola with the payload on the said aerostat. After these procedures, the lifting and withdrawing of the aerostat may or may not be remotely controlled, and the presence of people at the place of operation is unnecessary.

Therefore, the present invention stands out for having an anchoring platform that enables the automation of the lifting and withdraw procedures and for the increased safety of operation by not requiring physical contact of people with the aerostat, its ropes or any mechanical component while the aerostat is not firmly in the anchoring platform. The invention also enables the gondola and payload to be installed or uninstalled only when the aerostat is resolutely anchored to the cradle.

For the technologies suggested in the state of the art, when the aerostat is anchored, it is necessary to remove the payload and keep people away from the system as it is usually on a constantly moving rotating platform that can damage equipment and cause an incident involving people. These problems have been solved by this invention, which maintains the aerostat fixed on the platform, with the possibility of maintaining the payload by people, with reduced risk of accidents.

In short, the present invention solves one of the main problems in handling captive balloons, which is the excessive workload to place it in flight condition or anchored condition.

BRIEF DESCRIPTION OF THE INVENTION

The present invention relates to a lighter-than-air captive aircraft anchorage platform comprising a cradle (2), which function is to support the anchored aerostat, together with the winch (1) inside said cradle, and its function is to collect and lift the anchor cable (11) fixed to the aerostat. It is necessary to make use of a rope configuration, called cords (4), fixed to the balloon and anchor cable, which allows these cords to be wound by the winch.

By means of the present invention, it is possible for the anchoring platform to occupy up to three times less space than the aerostat occupies. In addition, the installation of said platform requires only one person and the operation can be performed remotely or by the control of a user.

DETAILED DESCRIPTION OF THE INVENTION

The present invention relates to a lighter-than-air captive aircraft anchoring platform comprising:
 a winch (1);
 a cradle (2);
 a confluence point (3);
 cords (4) together with a soft eye of the anchor cable (4.1) and loops of cords (4.2);
 an oblate spheroid shaped aerostat-type captive aircraft (5) optionally replaced with a cigar-shaped aerostat (6);
 a gondola (7);
 a circular closed rim (8);
 a rim support (8) based on cylindrical rods (9);
 a ferrule (10); and
 an anchor cable (11).

In short, the cradle (2) is the support base of the captive aircraft and is also a limiting inclination angle of the anchor cable (11); the winch (1) that is inside and at the bottom of said cradle (2) is used to withdraw and lift the anchor cable (11) attached to the captive aircraft. Additionally, the present invention has the configuration of cords (4), which is fixed to the captive aircraft and the anchor cable (11), which allow said cords (4) to be wound by the winch (1).

Figure 1:
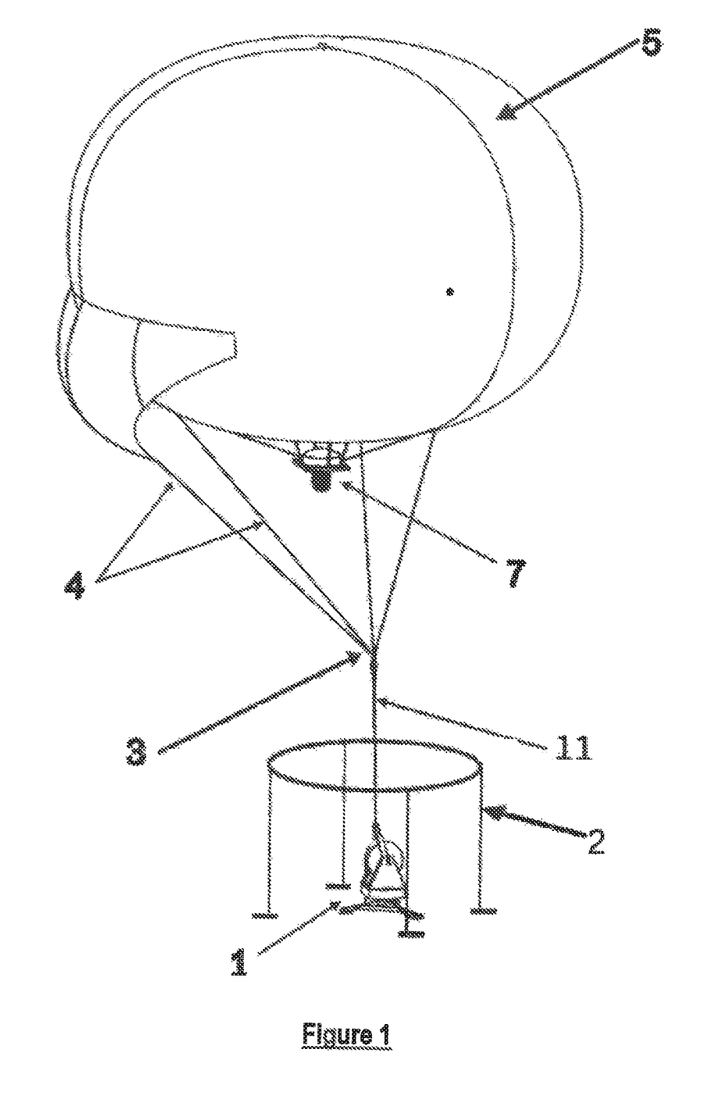
FIG. 1 is a graphical representation of the aerostatic system with the application of the lighter-than-air captive aircraft anchoring platform, wherein said oblate spheroid-shaped aerostat in flight state is characterized.
Figure 2:
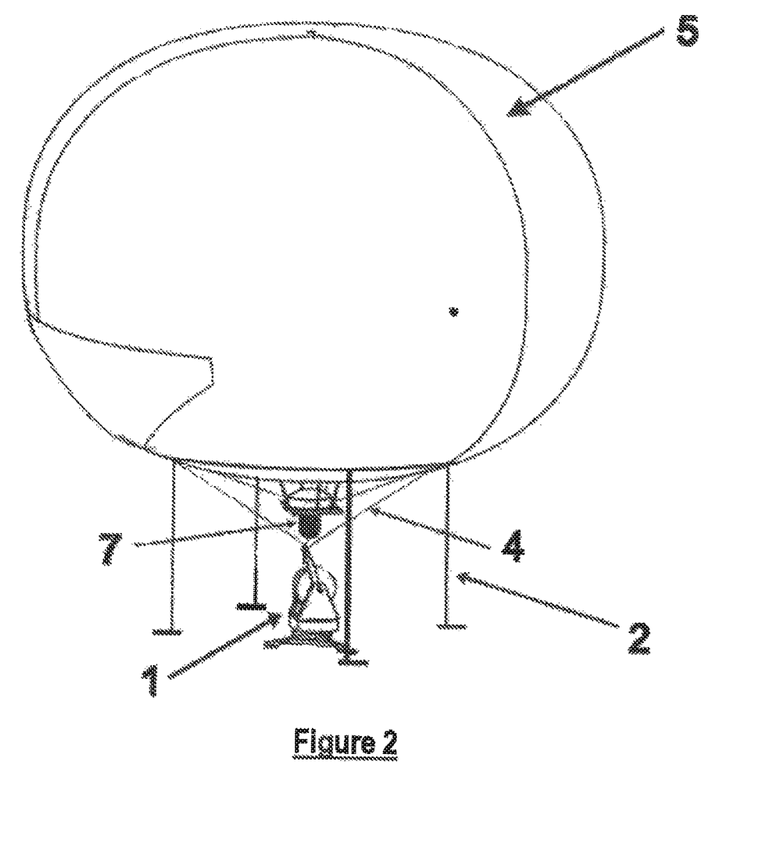
FIG. 2 is a graphical representation of the aerostatic system with the application of the lighter-than-air captive aircraft anchoring platform, wherein said oblate spheroid-shaped aerostat (5) is characterized in the anchored state.
Figure 3:
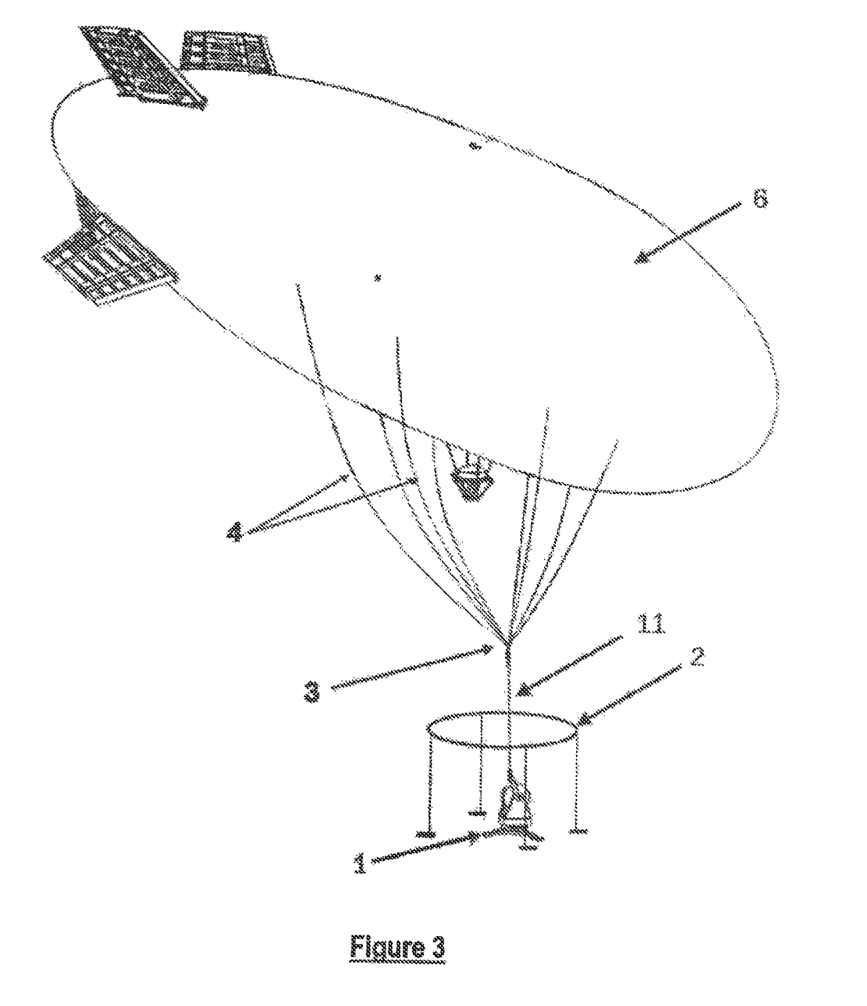
FIG. 3 is a graphical representation of the aerostatic system with the application of the lighter-than-air captive aircraft anchoring platform, wherein said cigar-shaped aerostat (6) is characterized in flight state.

The lighter-than-air aircraft preferably should be of the oblate spheroid-shaped aerostat type (5), further having the preferred dimensions of two equal axes between 2 and 10 meters in length, with a volumetric capacity of up to 200 cubic meters of gas. Optionally, the lighter-than-air aircraft may take on a cigar shape (6), with the preferential dimensions further being up to 26 meters in length and up to 480 cubic meters in volume, flying at a height of up to 1000 meters.

Figure 4:
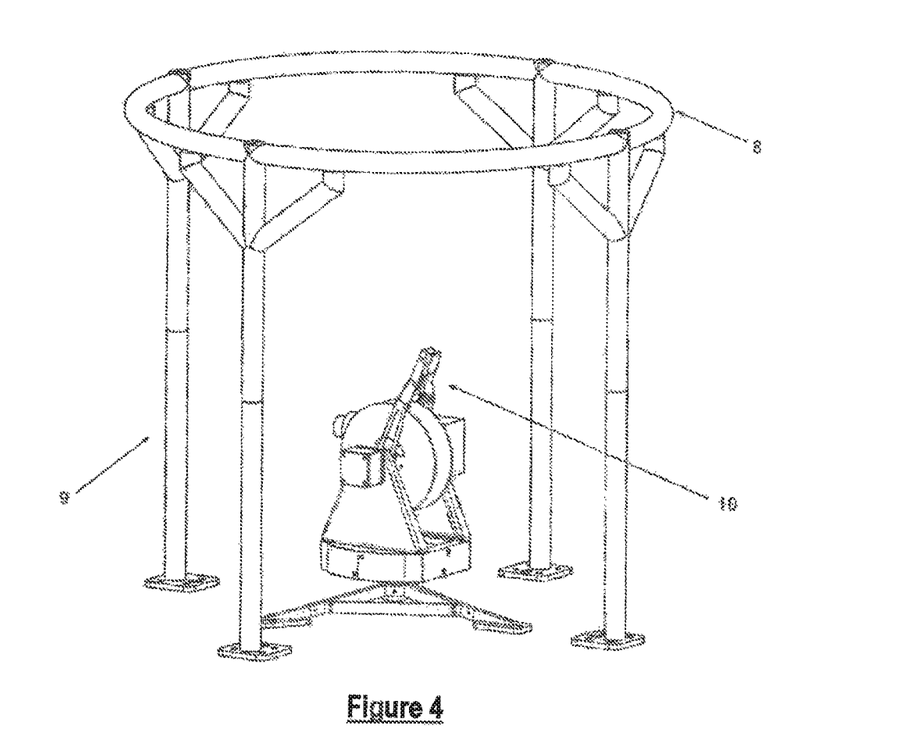
FIG. 4 is a graphical representation of the anchorage platform of lighter-than-air captive aircrafts detailing the cradle (2) and winch (1).

In the preferred embodiment of the present invention, the cradle (2) is an aerostat supporting anchor structure and has a circular closed rim shape (8) with a support based on cylindrical rods (9) with an optionally adjustable size of 3 meters high and 1 to 3 meters in diameter. Differently from the state of the art, the present invention innovates by disclosing a small aerostat platform that is 2 to 26.0 meters long, allowing the aerostat to switch from flight to anchored and from anchored to flight conditions without physical contact between the operator and structure or aerostat.

Especially where the aerostat has the optional cigar shape (6), the cradle (2) may have a rotating circular closed rim. In this configuration, the rim consists of two circular discs and, among them, rollers. The lower disk is fixed to the base of the cradle (2) and the upper disk supports the aerostat and is free to rotate. This configuration allows the cigar-shaped aerostat to orientate in the wind direction when docked.

The winch (1) is responsible for withdrawing and lifting the captive aircraft and its ground control and should be able to rotate around its vertical and horizontal axes, favoring the winding of the anchor cable (11) with little or no friction, which is still preferably a portable device of dimensions smaller than 1.5 meters long, 1.5 meters wide and 1.0 meters high. While the support for the balloon anchor lifting is the cradle (2) supporting the aerostat, the winch (1) exerts a tension to maintain the same fixed to the frame.

Figure 5:
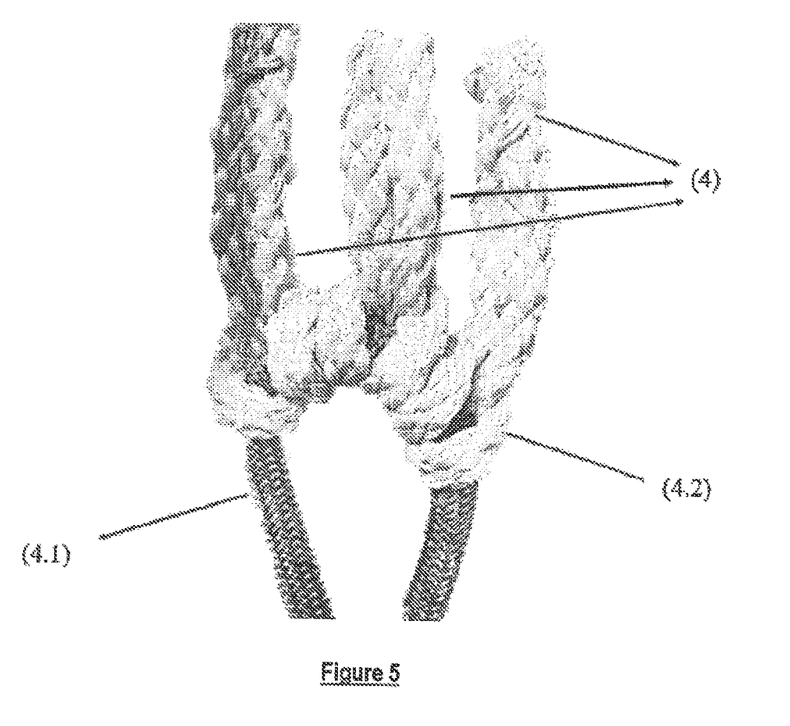
FIG. 5 is a graphical representation of the confluence point and the concept of loops between soft eyelets of the cords (4) and soft eyes of the anchor cable (11).

The cords (4) are fixed at two ends and their ends consist of soft eyes of the ropes, that is, without metal parts, obtained by stitching the cords (4) on themselves. The first fastening end is a metal ring on top of the lighter-than-air captive aircraft. The cords (4) then pass through eyes fixed on the aerostat that maintain the cords in symmetrical spacing, being split by snap hooks located between 10 cm and 1 m below the equator. The other end to which the cords (4) are fixed is at the coupling between the lighter-than-air captive aircraft and the anchor cable (11), a so-called confluence point (3). The anchor cable (11) is terminated in a soft eyelet (4.1), without metallic materials, around which the cords (4) are looped (through the loops of cords (4.2), passing the cords (4) inside their own soft eyes of cords). Thus, said cords (4) are responsible for distributing the thrust and aerodynamic forces in the balloon and concentrating them in a single point, which is the confluence point (3), making it a concentration point of soft ropes at the same time, instead of a solid mechanical part, making it possible to withdraw and rewind this point by the winch (1). Due to this function of promoting the balance of forces applied to the balloon, this geometric location contributes to the stabilization of the aerostat.

This invention utilizes a winch (1) with a tailored ferrule (10), located at the end of the winch (1) for cable routing and preferably made of Teflon, capable of supporting the withdraw of the confluence point (3), which has a distance to the aerostat defined from the flight stability requirements of the aerostat. The entry of the confluence point (3) through the ferrule provides a gradual increase of aerostat stability while the balloon rests gently on the cradle (2). The fact that the cords are wound by the winch (1) allows the height of the cradle (2) to be smaller, which promotes the reduction of structure and allows the operator to reach the gondola (7).

It is worthy to highlight that the ferrule (10) acting on the passage of the cables during the withdraw, obeying the order of withdraw in which the anchor cable (11) passes, then the confluence point (3) and, finally, the cords (4) implies the gain of greater stability in the anchorage stage of the aerostat.

Said platform can be installed by only one person on a mobile base, such as a trailer, or be installed on a fixed base.

During the installation of the platform only one person is required to secure the balloon ropes, inflate the balloon and fix the gondola (7) with a paid load on said aerostat. The fixation of the gondola (7) is made directly at the aerostat, preferably at its lower pole if its shape is an oblate spheroid (5), or in analogous position when its shape is a cigar (6), such that the gondola (7) is in a protected position and sufficiently far from the metal structures of the platform and cords (4), even in the anchored position.

Commands to perform both lifting and withdrawing operations can be done by one person, who controls movements through a push button strip wirelessly connected to the winch (1).

Another possibility is that these commands can be remote through a central unit without requiring operators at the system installation location. To do this, the system must be connected to a network (the Internet, for example) with the function of receiving and sending balloon control data. For decision making, when lifting or withdrawing the system, a combination of sensors and/or weather information can be used. In addition, autonomous decision making is possible when a system capable of interpreting the sensor reading and acting according to predefined parameters is available.

Those skilled in the art will appreciate the knowledge presented herein and can reproduce the invention in the embodiments presented and in other variants within the scope of the appended claims.

The invention claimed is:

1. An anchoring platform for a captive lighter-than-air aircraft that is configured as an oblate spheroid shaped aerostat type captive aircraft having a gondola or cigar-shaped aerostat captive aircraft having a gondola, the anchoring platform configured to enable the captive lighter-than-air aircraft to switch from captive flight to anchored conditions and from anchored to captive flight conditions without physical contact between an operator and the anchoring platform, the anchoring platform comprising:
   a cradle configured as a supporting anchor for the captive lighter-than-air aircraft, wherein the cradle includes a circular closed rim that is supported by cylindrical rods;
   a winch positioned within the cradle and configured to withdraw and lift the captive lighter-than-air aircraft;
   cords each having a first end fixed to the to the captive lighter-than-air aircraft and a second end;
   an anchor cable having a first end attached to the captive lighter-than-air aircraft and a second end attached to the second end of the cords to define a confluence point, thereby distributing a thrust of aerodynamic forces of the captive lighter-than-air aircraft forces during operation and concentrating such forces at the confluence point and facilitating withdrawing and rewinding the confluence point by the winch; and
   a ferrule positioned at an end of the winch and configured to support a withdrawal of the anchor cable and receive the confluence point,
   wherein the anchor cable and confluence point are configured to enter the winch through the ferrule when the captive lighter-than-air aircraft is in an anchored condition.

2. The platform according to claim 1, wherein the oblate spheroid-shaped aerostat-type captive aircraft has dimensions of two axes of between 2 and 10 meters in length, with a volumetric capacity of up to 200 cubic meters of gas, while the cigar-shaped aerostat-type captive aircraft has dimensions of up to 26 meters in length, and up to 480 cubic meters in volume.

3. The platform according to claim 1, wherein the cradle is an aerostat-supporting anchor structure and has circular closed-rim shape supported by cylindrical rods.

4. The platform according to claim 1, wherein the second end of the anchor cable is terminated in a soft eyelet, without metallic materials, around which the cords are looped.

5. The platform according to claim 1, wherein the winch is configured to tension the captive lighter-than-air aircraft and located in the central and lower part of the cradle, to withdraw and lift the anchor cable of the captive aircraft, and to control the captive lighter-than-air aircraft on the ground, to rotate around its vertical and horizontal axes and favoring the winding of the anchor cable with little or no friction.

6. The platform according to claim 1, wherein the cords are terminated in soft eyes of the cords by stitching themselves without metallic materials and are fixed in the coupling between the light-than-air captive aircraft and the anchor cable, comprising a soft eye at the end of the anchor cable without metallic materials, around which said cords are looped through cord loops.

7. The platform according to claim 1, wherein the ferrule is configured for cables to pass during a withdraw, in which a withdraw order is obeyed, it passes the anchor cable, the confluence point and the cords.

8. The platform according to claim 1, wherein the gondola is fixed to the captive lighter-than-air, when its shape is an oblate spheroid, or when its shape is a cigar-shape, such that the gondola is in a protected position and away from metal structures of the platform and cords, even in an anchored position.

9. The platform according to claim 1, wherein the anchoring platform is installed by a signal user on a mobile base.

10. The platform according to claim 9, wherein the platform is controlled by instructions sent remotely through a central unit connected to the same network, in which a decision to lift or withdraw the system is autonomous based on sensor information and weather information analyzed in a preset standard, or optionally manually as directed by and operator.

11. The platform according to claim 3, wherein cylindricals are adjustable in size, of 1 to 3 meters high and/or 1 to 3 meters in diameter.

12. The platform according to claim 1, wherein the anchoring device is a portable device with dimensions smaller than 1.5 meters long, 1.5 meters wide and 1.0 meter high.

13. The platform according to claim 5, wherein the ferrule is located at an end of the winch and is configured for cables to pass during a withdraw, in which a withdraw order is obeyed, it passes the anchor cable, the confluence point and the cords.

14. The platform according to claim 1, wherein the ferrule is coated with polytetrafluoroethylene (PTFE) with a hole of internal diameter between 4 and 100 mm.

15. The platform according to claim 5, wherein the ferrule is coated with PTFE with a hole of internal diameter between 4 and 100 mm.

16. An anchoring platform for captive lighter-than-air aircrafts, the platform configured to enable the captive lighter-than-air aircrafts to switch from captive flight to anchored conditions and from anchored conditions to captive flight conditions without physical contact between an operator and the anchoring platform, the anchoring platform comprising:
   a captive lighter-than-air aircraft that is configured to switch from captive flight to anchored conditions and from anchored conditions;
   a cradle configured as a supporting anchor for the captive lighter-than-air aircraft, wherein the cradle includes a circular closed rim that is supported by cylindrical rods;
   a winch positioned within the cradle and configured to withdraw and lift the captive lighter-than-air aircraft;
   cords each having a first end fixed to the to the captive lighter-than-air aircraft and a second end;
   an anchor cable having a first end attached to the captive lighter-than-air aircraft and a second end attached to the second end of the cords to define a confluence point, thereby distributing a thrust of aerodynamic forces of the captive lighter-than-air aircraft forces during operation and concentrating such forces at the confluence point and facilitating withdrawing and rewinding the confluence point by the winch;
   a ferrule positioned at an end of the winch and configured to support a withdrawal of the anchor cable and receive the confluence point,
   wherein the anchor cable and confluence point are configured to enter the winch through the ferrule when the captive lighter-than-air aircraft is in an anchored condition.

17. The anchoring platform of claim 16 wherein the second end of the anchor cable is terminated in a soft eyelet, without metallic materials, around which the cords are looped.

18. The anchoring platform of claim 16 wherein the captive lighter-than-air aircraft is configured as an oblate spheroid shaped aerostat type captive aircraft having a gondola or cigar-shaped aerostat captive aircraft having a gondola.

* * * * *